(12) United States Patent
Toennessen

(10) Patent No.: US 7,499,373 B2
(45) Date of Patent: Mar. 3, 2009

(54) APPARATUS AND METHODS FOR SEISMIC STREAMER POSITIONING

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/055,481

(22) Filed: Feb. 10, 2005

(65) Prior Publication Data

US 2006/0176775 A1 Aug. 10, 2006

(51) Int. Cl.
*G01V 1/38* (2006.01)
(52) U.S. Cl. ............................ 367/16; 367/17; 114/242; 114/246
(58) Field of Classification Search ............. 367/15–20, 367/153, 154; 114/242, 246
See application file for complete search history.

(56) References Cited

U.S. PATENT DOCUMENTS

| | | | | |
|---|---|---|---|---|
| 3,414,874 | A * | 12/1968 | McLoad | 367/20 |
| 4,781,140 | A * | 11/1988 | Bell et al. | 367/15 |
| 4,890,568 | A * | 1/1990 | Dolengowski | 114/246 |
| 5,193,077 | A | 3/1993 | Weiglein et al. | |
| 5,983,821 | A * | 11/1999 | Williams | 114/244 |
| 5,986,975 | A * | 11/1999 | Bauer et al. | 367/106 |
| 6,305,308 | B1 * | 10/2001 | Kristiansen et al. | 114/244 |
| 6,493,636 | B1 | 12/2002 | DeKok | |
| 6,671,223 | B2 | 12/2003 | Bittleston | |
| 6,694,909 | B1 * | 2/2004 | Cipolla et al. | 114/242 |
| 6,766,755 | B2 * | 7/2004 | Cipolla et al. | 367/154 |
| 6,775,618 | B1 | 8/2004 | Robertsson et al. | |
| 6,877,453 | B2 * | 4/2005 | Hocquet et al. | 114/244 |
| 6,879,542 | B2 * | 4/2005 | Soreau et al. | 367/17 |
| 6,932,017 | B1 | 8/2005 | Hillesund et al. | |
| 6,985,403 | B2 * | 1/2006 | Nicholson | 367/16 |

FOREIGN PATENT DOCUMENTS

| | | |
|---|---|---|
| GB | 2233455 A | 1/1991 |
| GB | 2401179 A | 11/2004 |
| WO | WO 00/57207 A1 | 9/2000 |
| WO | WO 2005019868 A1 | 3/2005 |

OTHER PUBLICATIONS

GB Examination Report on British Patent Application No. 0602197.6, dated Feb. 11, 2008.

* cited by examiner

*Primary Examiner*—Jack W. Keith
*Assistant Examiner*—Scott A Hughes
(74) *Attorney, Agent, or Firm*—Ari Pramudji; Liangang (Mark) Ye; Jeffrey E Griffin

(57) ABSTRACT

Apparatus, systems and methods for connecting two seismic streamers are disclosed that enable two streamers to be towed in a desired arrangement. One apparatus comprises an elongate member having a first portion and a second portion, and an orientation member connected to the elongate member between the first and second portions, the orientation member functioning, when the streamers are connected by the apparatus and towed, to maintain orientation of the streamers. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

16 Claims, 8 Drawing Sheets

FIG. 8
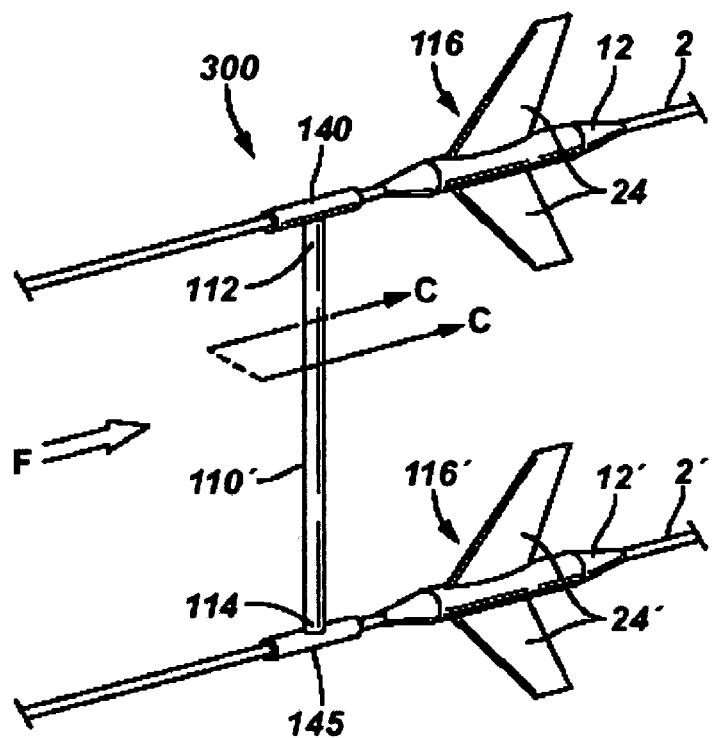
FIG. 9
FIG. 10    FIG. 11    FIG. 12
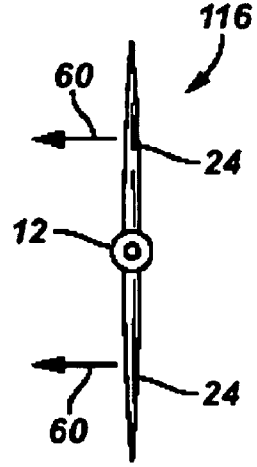 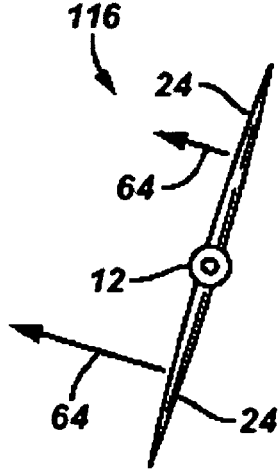 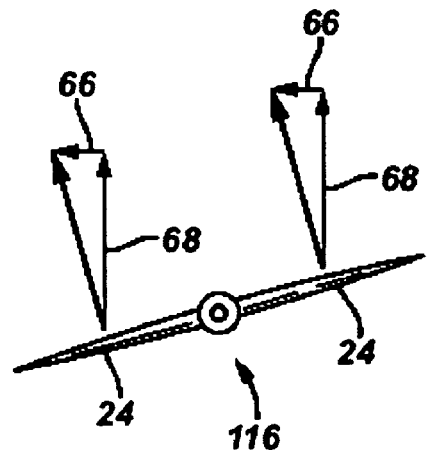

US 7,499,373 B2

APPARATUS AND METHODS FOR SEISMIC STREAMER POSITIONING

BACKGROUND OF THE INVENTION

1. Field of Invention

The present invention relates to the field of marine seismic instrumentation and methods of using same. More specifically, the invention relates to apparatus and methods for improving seismic images obtained using seismic instrumentation, as well as related systems, methods, and devices.

2. Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Previous attempts have not provided optimal de-ghosting of marine seismic images. While these techniques are improvements in the art, further improvement is desired.

SUMMARY OF THE INVENTION

In accordance with the present invention, apparatus, systems and methods are described for positioning seismic streamers, as well as seismic streamers positioned in a desired orientation employing the apparatus and systems, and methods of controlling position of streamers so connected. The apparatus, systems and methods of the invention reduce or overcome problems with previous apparatus and methods. Apparatus, systems and methods of the invention may be used to collect data that can be de-ghosted using mathematical filters that are valid only when the streamers are separated at a constant vertical separation.

A first aspect of the invention is an apparatus comprising:
(a) an elongate member having a first portion and a second portion; and
(b) an orientation member, the orientation member functioning, when two streamers are connected by the elongate member and towed, to maintain a desired orientation of the streamers.

The elongate member may comprise a front part of a hydrofoil, while the orientation member may comprise first and second hydrodynamic flaps attached to the elongate member, each flap adapted to move independently during a seismic data acquisition run. In another embodiment the elongate member may be an elongate rod, and the orientation member comprises an even number of hydrofoils rotatably mounted to the elongate rod and able to move independently. In yet another embodiment, the elongate member is an elongate rod, and the orientation member comprises one or more remotely controllable birds mounted on the first and second streamers. An alternative to the latter embodiment is mounting the birds inline in the streamers. The elongate rod may exist as one or more than one member. In all embodiments the orientation member may be remotely controllable.

The first portion of the elongate member may be releasably secured to the first streamer via a first mount. The second portion of the elongate member may be securely fastened to the second streamer. The first and second portions may be first and second ends of the elongate member. The first portion of the elongate member may be mounted to a first streamer employing a clamp, and the clamp may be adjacent an inductor inside the first streamer for supplying electricity to the apparatus. Alternatively, a battery may be operatively connected to the clamp. The second portion of the elongate member may be releasably mounted to the second streamer via a second mount. The first mount may connect either the first portion or the second portion of the elongate member to a streamer in a fashion allowing electrical power to flow to the apparatus other than by induction. The first mount may include a hold and release mechanism, which allows easier take-up and roll-out of the pair of streamers.

A second aspect of the invention is a system comprising:
(a) a first seismic streamer;
(b) a second seismic streamer; and
(c) a connecting element that connects the first and second steamers, the connecting element comprising an elongate member having a first portion connected to the first streamer, a second portion connected to the second streamer, and an orientation member, the orientation member functioning, when the system is towed, to maintain orientation of the first and second seismic streamers.

Systems of the invention include those systems wherein the first streamer is positioned at a shallower depth than the second streamer, and systems wherein the first streamer is positioned over the second streamer in over/under configuration.

Another aspect of the invention comprises methods of controlling orientation of a pair of seismic streamers, one method comprising:
(a) connecting a first and a second streamer with a connector; and
(b) adjusting an orientation member to control a desired relative position between the first and second streamers.

Methods of the invention may comprise wherein said orientation member is connected to the connector and the adjusting is performed by communicating with the orientation member. Communicating with the orientation member may be performed by telemetry selected from hard wire, wireless, and optical telemetry. Other methods of the invention comprise adjusting one or more of the orientation members to move the pair of seismic streamers to a desired position, which may be any direction in 3-dimensions, for example lateral (horizontal), vertical, or any direction in between these extremes. The desired position may be relative to another pair of streamers. The other pair of streamers may employ apparatus of the invention.

Apparatus, systems and methods of the invention will become more apparent upon review of the brief description of the drawings, the detailed description of the invention, and the claims which follow.

BRIEF DESCRIPTION OF THE DRAWINGS

The manner in which the objectives of the invention and other desirable characteristics can be obtained is explained in the following description and attached drawings in which:

FIG. 8 illustrates a perspective view of a third apparatus of the invention;

FIG. 9 is a cross-sectional view, taken along the line C-C of FIG. 8;

FIGS. 10 to 12 illustrate operation of the orientation member of the system of FIGS. 8-9;

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

The present invention relates to various apparatus, systems and methods for controlling position of one or more marine seismic components. One aspect of the present invention relates to apparatus for positioning seismic streamers. Another aspect of the invention is a combination of two streamers connected using an apparatus of the invention and comprising a system. Other aspects of the present invention, which are further explained below, relate to methods for remotely controlling position of marine seismic streamers. The terms "orientation member", "hydrodynamic flap", and "flap" are generally used interchangeably herein, although it will be recognized by those of skill in the art that a flap is a specialized device used in aviation to control lift of an airplane. In this sense, "orientation member" is deemed broader than "flap" in that the orientation members described herein are capable of movements that may result in any one or multiple straight line or curved path movements of the apparatus of the invention in 3-dimensions, such as lateral, vertical up, vertical down, horizontal, and combinations thereof. The terms "controlling position", "position controllable", "remotely controlling position" and "steering" are generally used interchangeably herein, although it will be recognized by those of skill in the art that "steering" usually refers to following a defined path, while "controlling position", "position controllable", and "remotely controlling position" could mean steering, but also could mean merely maintaining a relative position, for example relative to one or more reference points, such as natural or man-made objects, or merely deflecting an object. As "position controllable" and "controlling position" are somewhat broader terms than "steering", these terms are used herein, except when specific instances demand using more specific words.

Figure 1:
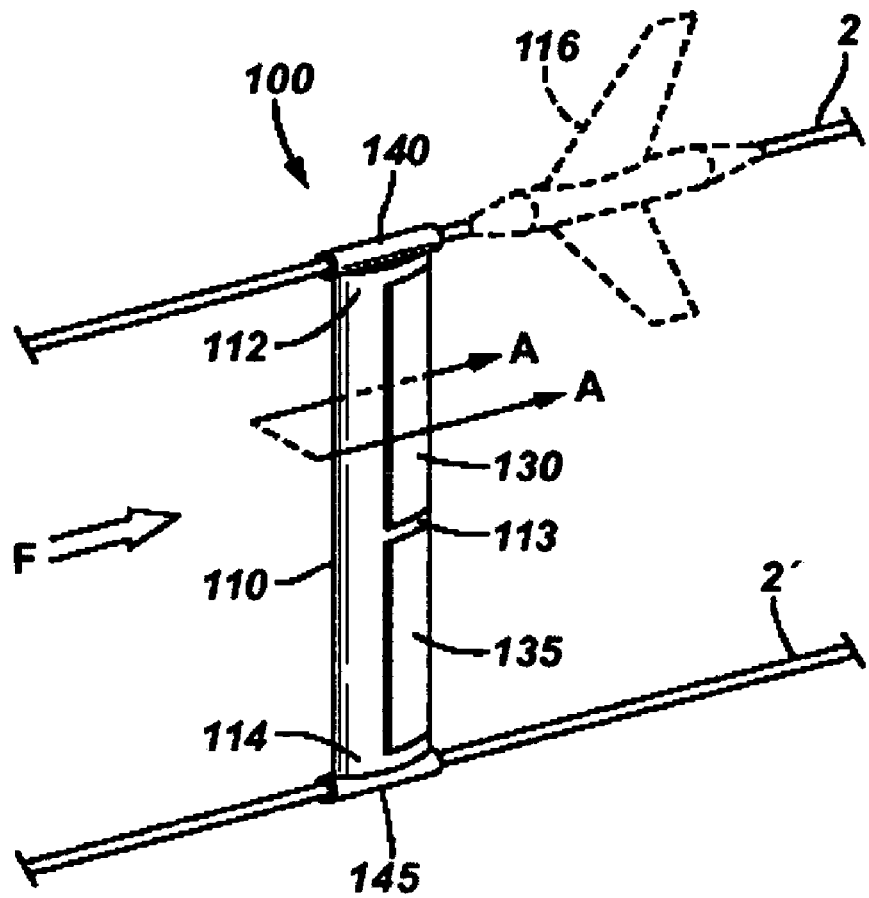
FIG. 1 is a perspective view of a first apparatus of the invention.

As an example, FIG. 1 illustrates a perspective view of one apparatus embodiment 100 of the invention. Identical reference numerals are used throughout the drawing figures when the same component or element is referred to in different figures. Streamers 2 and 2' are illustrated in over/under arrangement connected together by an elongate rigid or semi-rigid member 110 having first and second ends 112 and 114 and a central portion 113, end 112 being connected with a first streamer coupler 140, and second end 114 connected via a second streamer coupler 145. The large arrow labeled "F" denotes the direction of travel of water past apparatus 100 when apparatus 100 is in use, being towed by a tow vessel (not illustrated). Streamers 2 and 2' may be positioned a desired distance apart, generally ranging from about 1 to about 50 meters, about 5 meters being typical, although the upper bound for the separation distance is only limited by the materials of construction and the surrounding environment, for example, depth of water, obstruction in the water, and the like. Two independently moveable orientation members 130 and 135, sometimes referred to herein as flaps, are illustrated mounted to and aft of elongate member 110 (referenced to a flow direction, indicated by arrow "F" in FIG. 1). Alternatively, or in addition thereto, orientation members 130 and 135 may be mounted to streamer couplers 140 and 145, as discussed in more detailed herein. Orientation members may number more or less than two. An even or odd number may be employed, although with an odd number certain other parameters may need adjustment. (For example, with three flaps, the size (surface area) of one flap might be twice the size of the two remaining flaps in order to achieve balanced forces.) Also shown in phantom is an optional bird 116, which may be employed in certain embodiments of the invention, as explained further below.

Figure 2:
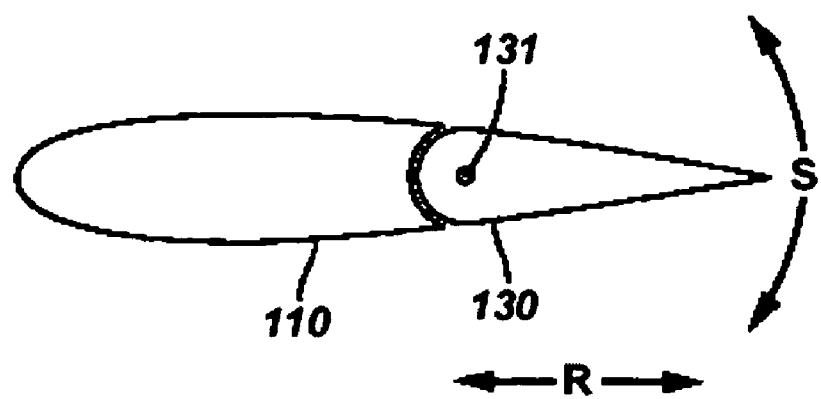
FIG. 2 is a cross-sectional view, taken along the line A-A of FIG. 1.

FIG. 2 illustrates a cross-sectional view along the section A-A of FIG. 1, illustrating the relative position of elongate member 110 and orientation member 130 when orientation member 130 is mounted on a hollow or solid shaft 131, as more fully discussed in reference to FIGS. 14 and 15. Double-headed arrow "S" illustrates how orientation member 130 might swivel or pivot on shaft 131 in accordance with the invention. Orientation member 135 is similarly moveable. Orientation members 130 and 135 may either be retractable and extendable in the direction indicated by the double-headed arrow "R", as in retractable airplane flaps, or may be in a fixed position, as illustrated. In any case, the movement S is allowed in at least one direction. In as much as the functions of elongate member 110 are primarily to connect streamers 2 and 2', and serve in controlling distance between streamers 2 and 2', member 110 may be any shape, cross-section, or material of construction as desired. For example, the cross-section of elongate member 110 could be oval or rectangular; its material of construction may be metal, plastic, composite, and the like. One or more parallel, closely spaced elongate members are possible. As well, more than one elongate member may be employed, fit together or joined to form one elongate member, and shaft 131 may comprise more than one shaft, as illustrated in FIG. 14. Elongate member 110 could comprise any number of alternative arrangements, including pipe-in-pipe, solid rod-in-pipe, solid rod-in-box arrangements, and the like, allowing sensors, transmitters, receivers, and the like to be carried by elongate member 110.

Although orientation members 130, 135, and 116 are illustrated in FIGS. 1 and 2 positioned aft of elongate member 110 connecting streamers 2 and 2', it will be understood by those of ordinary skill in the art that the orientation member or members may be positioned forward of elongate member 110, as is known in the aerodynamics art. Moreover, the use of both fore and aft flaps are deemed variants within the present invention. It is also considered within the invention for the orientation member to comprise one or more birds, for example, a combination of an elongate connection member and a bird attached to each streamer near the connecting points between the streamers and the elongate member. These embodiments may or may not include flaps 130 and 135 as illustrated in FIG. 1. An embodiment with no flaps is discussed in reference to FIG. 8 herein. Birds may be positioned fore or aft of elongate member 110.

Figure 3A:
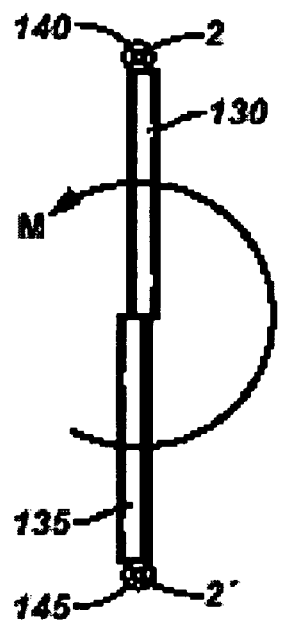
FIGS. 3A and 3B are schematic rear views of the apparatus of FIG. 1 where two orientation members are displayed in two alternative orientations.
Figure 3B:
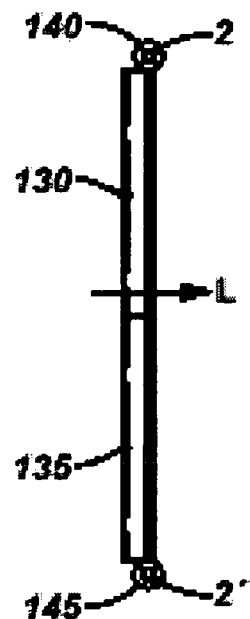

Very often water currents vary significantly with depth and the two streamers in a pair are easily brought out of the ideal position, which may be directly on top of each other in an "over and under" configuration. To correct for that, apparatus of the invention are adept at enforcing a moment on the streamer pair, as illustrated in FIG. 3A. As illustrated in FIG. 3A, a moment (denoted by arrow "M") may be accomplished by moving orientation members 130 and 135 in opposing directions. In other situations currents induce so-called "feathering" to the streamer pair, or the current may vary along the length of the streamer pair causing the streamer pair to "snake." In such situations, it may be desirable to induce a net force on the streamer pair, as illustrated by the arrow "L" in FIG. 3B, by moving all orientation members, in this case 130 and 135, in the same direction. It is within the invention to provide for both movements exemplified by FIGS. 3A and 3B, that is, both a moment and a translational force simultaneously.

Figure 4:
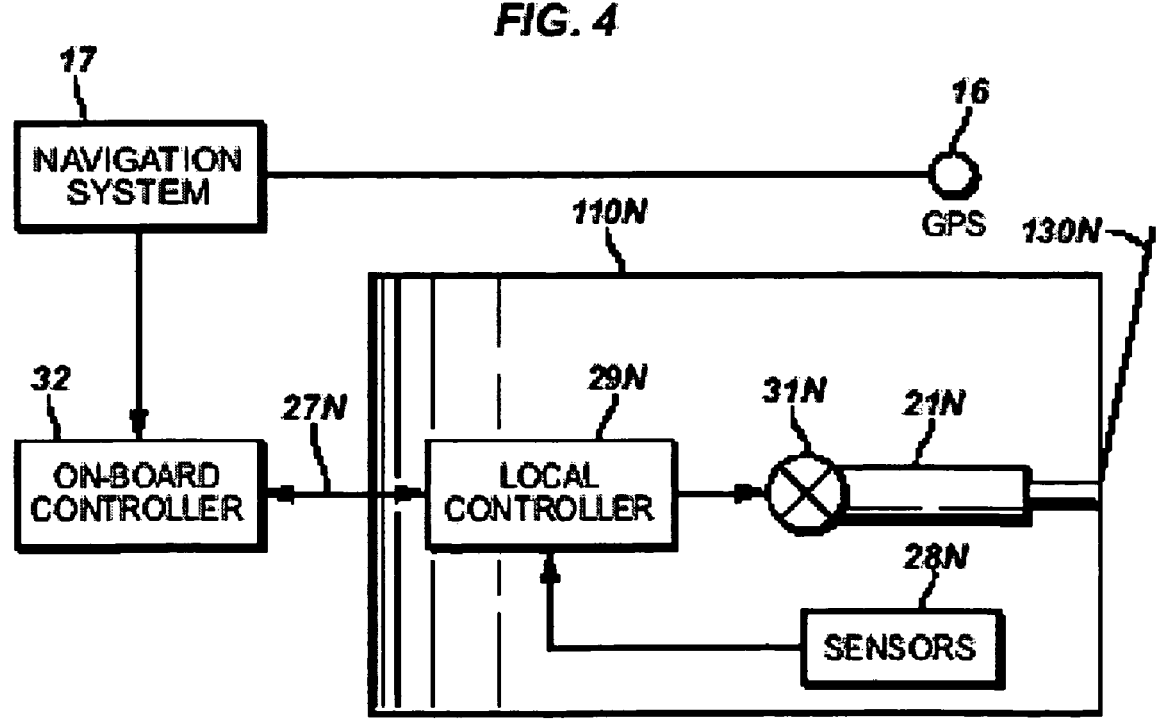
FIG. 4 illustrates a control scheme that may be utilized to control orientation members in apparatus of the invention.
Figure 5:
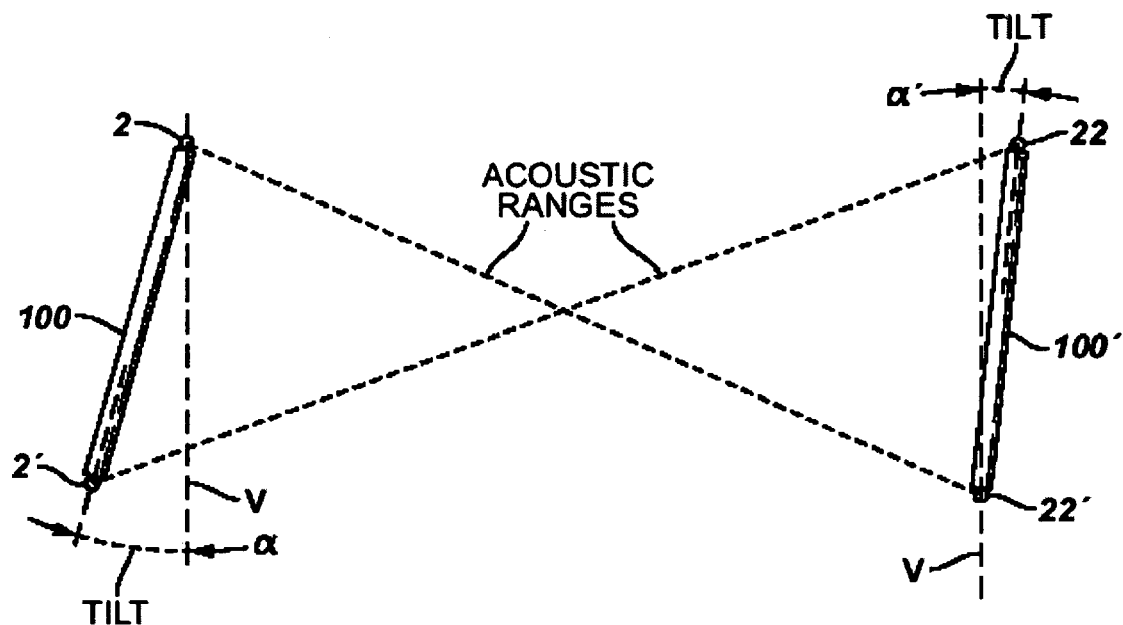
FIG. 5 illustrates schematically an acoustic ranging method for sensing tilt of a pair of streamers connected using an apparatus of the invention.

FIG. 4 is a schematic diagram of a control scheme useful with the apparatus of FIGS. 1-3. In FIG. 4, "N" refers to the Nth apparatus, while N1, N2, on so on refer to an N1 apparatus, an N2 apparatus, and so forth. A positioning unit 16, mounted on a float 8 (not illustrated) attached to apparatus 100N (FIG. 1) transmits position of apparatus 100N to a navigation system 17 located on the tow vessel (not illustrated). Navigation system 17 provides the location information received from positioning unit 16 to an on-board supervisory controller 32. On-board supervisory controller 32 may be a computer, a distributed control system, an analog control system or other control device known to those having ordinary skill in the art. On-board supervisory controller 32 may communicate with a local controller 29N mounted in or on elongate member 110N through a separate umbilical 27N, or through a combination of an umbilical and streamer 2 or 2', or may alternatively communicate through a wireless or optical transmission. Local controller 29N may also be positioned within or on one of the streamer couplers, 140, 145 (FIG. 1). Umbilical 27N contains conductors for providing power and control signals to and from streamer 2 or 2'. Local controller 29N may send a signal to an electric motor 31N that moves an actuator 21N, which in turn moves orientation member 130N. When orientation member 130N moves, the lateral force imparted against it by the water directs streamers 2 and 2' to the desired position. Sensors 28N may detect the angular position of orientation member 130N and feedback information to local controller 29N and, optionally, to on-board supervisory controller 32 where it may be displayed for an operator to read. Sensor 28N may also be used as a tilt sensor to sense the tilt angle between pairs of steamers. This is one of at least two alternatives of determining the tilt. An alternative method is illustrated in FIG. 5. Difference signals, along with any feed-forward information received through an input 32N, any information about other apparatus N1, N2, etc., through input 33N, and any supervisory control signals received from supervisory controller 32 through input 45N may be used by local controller 29N to calculate the roll angle of orientation member N and, optionally of any birds, which together will produce the necessary combination of vertical force (upwardly or downwardly) and lateral force (left or right) required to move apparatus N to a desired depth and lateral position. Local controller 29N then adjusts each orientation member N independently by means of the motor 31N, so as to start to achieve the calculated roll angle and wing angular positions. Information may also be sent to other apparatus N1, N2, etc., through output 43N, and information may be sent to on-board supervisory controller 32, if any, through an output 41N. Numerous variations in the control scheme are possible. Supervisory controllers, feed-forward controllers, and the like may be cascaded with local controller 29N. Other control schemes are possible, either alone, or cascaded with the feedback control. A control scheme may comprise a so-called feed-forward controller utilizing information about currents, wind, and other environmental conditions, in order to counteract for any deviations relative to the nominal that is predicted to take place, and do so before the deviation actually takes place or to do so in an early stage of the deviation. An adaptive control scheme may also be used.

FIG. 5 illustrates schematically methods for sensing tilt of a pair of streamers connected using an apparatus of the invention. Streamers 2 and 2' are illustrated connected via an apparatus of the invention 100, while streamers 22 and 22' are illustrated as connected using a second apparatus 100' of the invention. Apparatus 100 and 100' may be identical, similar, or different in construction. For example, they may be of the same length (same distance between streamers) but have differing numbers or styles of orientation members, or they may have identical number and style of orientation members, but be of different lengths (different separation distance between streamers). One orientation member could be like embodiment 100 described in reference to FIGS. 1-3, while the other might be like embodiment 200 of FIG. 6 or embodiment 300 of FIGS. 8-9. Real time tilt angles, $\alpha$ and $\alpha'$, relative to vertical (indicated by dashed lines marked "V") may be sensed using one or more tilt sensors operatively coupled to one or more local controllers. The controllers and sensors are not illustrated for clarity. FIG. 5 shows that tilt angles could also be sensed using acoustic ranges (indicated by dotted lines) between streamer 2 and steamer 22', and between streamer 2' and streamer 22. The acoustic ranges may be used to calculate the real time tilt angles, $\alpha$ and $\alpha'$, of the streamer pairs. In either case, a non-zero tilt value indicates that the streamers are not located directly on top of each other. A human or computer may then make corrective action through a control scheme as discussed in reference to FIG. 4, by movement of one or more orientation members (such as illustrated in FIG. 3). Using the orientation members to maintain the apparatus in the desired position and orientation may minimize tilt.

Figure 6A:
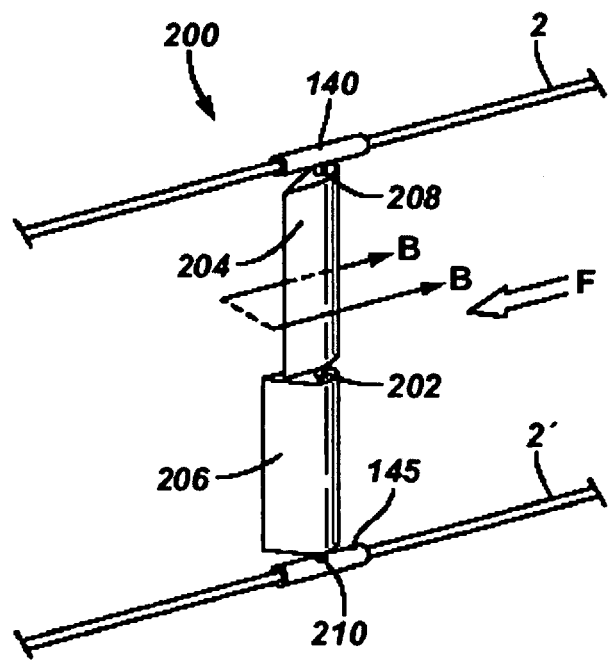
FIGS. 6A and 6B illustrate perspective and cross-sectional views, respectively, of a second apparatus of the invention.

FIGS. 6A and B illustrate perspective and cross-sectional views, respectively, of a second apparatus 200 of the invention. Streamers 2 and 2' are illustrated connected together via an elongate member 202 comprising an elongate, cylindrical rod having ends 208 and 210 connected to steamers 2 and 2', respectively, using couplers 140 and 145. In as much as the functions of elongate member 202 are primarily to connect streamers 2 and 2', and serve as an attachment or support for orientation members 204 and 206, member 202 may be any shape, cross-section, or material of construction as desired. For example, the cross-section of elongate member 202 could be oval or rectangular; its material of construction may be metal, plastic, composite, and the like. In apparatus 200, orientation members 204 and 206 may be allowed to pivot freely, or they may be coupled to elongate member 202 and/or steamers 2 and 2' and their movements controlled remotely.

Figure 6B:
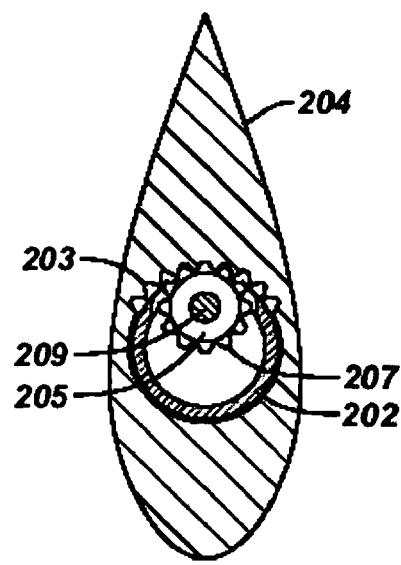

One or more orientation members are possible in this configuration. As well, more than one elongate member may be employed, attached together end-to-end. Elongate member 202 could comprise a pipe-in-pipe arrangement, where orientation members 204 and 206 are mounted on their own respective outer pipes or conduits, which are allowed to move about an inner pipe or solid rod. FIG. 6B, which is taken along the cross-section indicated as B-B in FIG. 6A, illustrates schematically one way of moving orientation member 204 by remote control. A hollow, cylindrical rod 202 has a section 203 having teeth that mesh with teeth 207 on a wheel or gear 205 having a diameter smaller than that of rod 202. Wheel or gear 205 may be mounted on a shaft 209 that is in turn connected to a motor or other prime mover, not shown, housed inside hollow rod 202 or elsewhere inside orientation member 204. A local controller, power supply, sensors, and the like, may also be housed inside hollow rod 202.

Apparatus of the invention may connect to at least one streamer in such a way that it is able to communicate with the outside world, which may be a vessel, satellite, or land-based device. The way this may be accomplished varies in accordance with the amount of energy the apparatus requires and the amount of energy the apparatus is able to store locally in terms of batteries, fuel cells, and the like. If the local storage capacity for batteries, fuels cells, and the like is sufficient, the mount or coupling to the master streamer (the streamer used for communication) can be similar to the methods used to power so-called "birds" used for steering streamers. These birds may be clamped onto the streamer skin at locations where there is located an inductor inside the streamer skin. Similarly, streamer couplers 140 and 145 (FIG. 1) may be clamped onto the streamer skin at such locations. Then the apparatus and the streamer can communicate through the skin with electrical impulses. If, on the other hand, the apparatus needs charging power from the streamer a different approach is required. In this case the apparatus may be mounted between two streamer sections and as such comprise an insert between two streamer sections, as described below.

Depending on the handling procedure, apparatus of the invention may require the ability to release one of the streamers in the sense that one streamer is, for some time, allowed to slide inside one of the streamer couplers or mounts 140, 145 (FIG. 1). This may be the streamer that is not the master streamer. This could be the scenario, for example, if for some reason it is not possible to operate the streamers in the desired parallel position, such as over-under position. This may be due to weather, obstructions, and the like, or because of desire to position streamers further fore or aft relative to the other or because the two streamers stretch differently under tension. In these cases the two streamers may have the capability to slide past each other inline relative to each other. An actuator allowing grasp and release of the streamer may be included in mounts 140 or 145 for this function.

Figure 13:
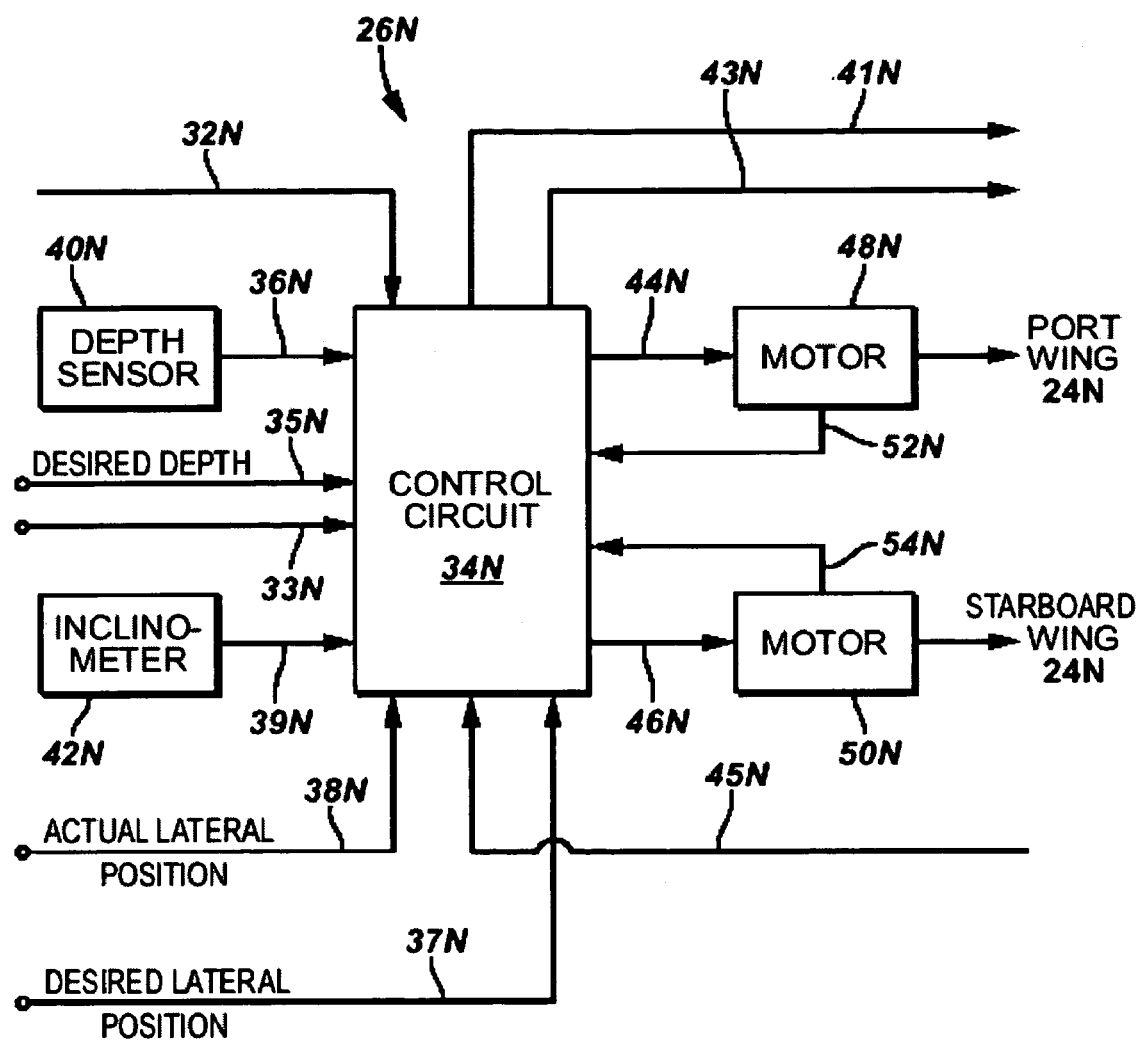
FIG. 13 illustrates a control scheme that may be utilized to control orientation members in the apparatus of FIGS. 8-9.

It is also within the invention to combine apparatus comprising elongate members, orientation members, and streamers as described with one or more other control devices, such as "birds." One type of bird useful in the invention is described in commonly assigned U.S. Pat. No. 6,671,223, describing a bird that is designed to be electrically and mechanically connected in series with a streamer. One embodiment of this bird, known under the trade designation "Q-FIN", available from WesternGeco L.L.C., Houston, Tex., has two opposed wings that are independently controllable in order to control a streamer's lateral position as well as its depth. Other birds useful in the invention include battery-powered birds suspended beneath the streamer and including a pair of laterally projecting wings, the combination of streamers, elongate member, orientation member, and birds being arranged to be neutrally buoyant. Clamp-on birds, as discussed previously, may also be employed. Birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the bird. The bird on-board controllers may communicate with local controllers mounted on or in elongate members of apparatus 100 of FIG. 1, such as described in FIG. 4, and/or communicate with other local controllers an/or remote controllers, such as a supervisory controller. Such a control system is discussed in reference to FIG. 13. Optionally, one or more birds controlled by a controlled scheme as illustrated in FIG. 13 may work in tandem with the controller and control scheme on-board apparatus 100 of FIG. 1, described in FIG. 4. For example, the control schemes could be cascaded. Working independently of or with apparatus 100, the bird control circuit may then adjust each of its wings independently by means of the stepper motors so as to start to achieve the calculated bird roll angle and wing angular positions. There may be instances where apparatus 100 is not operational and acting merely as a passive connector between streamers 2 and 2', such as in embodiment 300 of FIGS. 8-9, in which case birds attached to each streamer may function as orientation members to control relative position between streamers and/or steamer pairs. The wings may include quick release mechanisms. Birds useful herein may include seismic receivers such as hydrophones, and in such instances may include an elongate, partly flexible body to house one or more receivers.

As mentioned herein, materials of construction of apparatus of the invention may vary. However, there may be a need to balance the apparatus with the remainder of the seismic equipment so that the system is balanced to be neutrally buoyant in the water, or nearly so, to perform its intended function. Polymeric composites, with appropriate fillers used to adjust buoyancy and mechanical properties as desired, may be employed.

In use the position of a pair of streamers may be actively controlled by GPS or other position detector sensing the position of the streamer pair, and tilt sensors, acoustic sensors, or other means may sense the orientation of one or more individual streamers and feed this data to navigation and control systems. Alternatively, data may be fed-forward to local controllers on apparatus of the invention. Gross positioning and local movement of the streamer pair may be controlled on board a tow vessel, on some other vessel, locally, or indeed a remote location. By using a communication system, either hardwire or wireless, information from the remote controller may be sent to one or more local controllers on apparatus of the invention, including connectors and, when present and when desired, one or more birds. The local controllers in turn are operatively connected to adjustment mechanisms comprising motors or other motive power means, and actuators and couplers connected to the orientation members (flaps), and, if present, birds, which function to move the apparatus as desired. This in turn adjusts the position of the streamer pair, causing it to move as desired. Feedback control may be achieved using local sensors positioned as appropriate depending on the specific embodiment used, which may inform the local and remote controllers of the position of one or more orientation members, the tilt angle of a pair of streamers, distance between streamer pairs, a position of an actuator, the status of a motor or hydraulic cylinder, the status of a bird, and the like. A computer or human operator can thus access information and control the entire positioning effort, and thus obtain much better control over the seismic data acquisition process.

Figure 7:
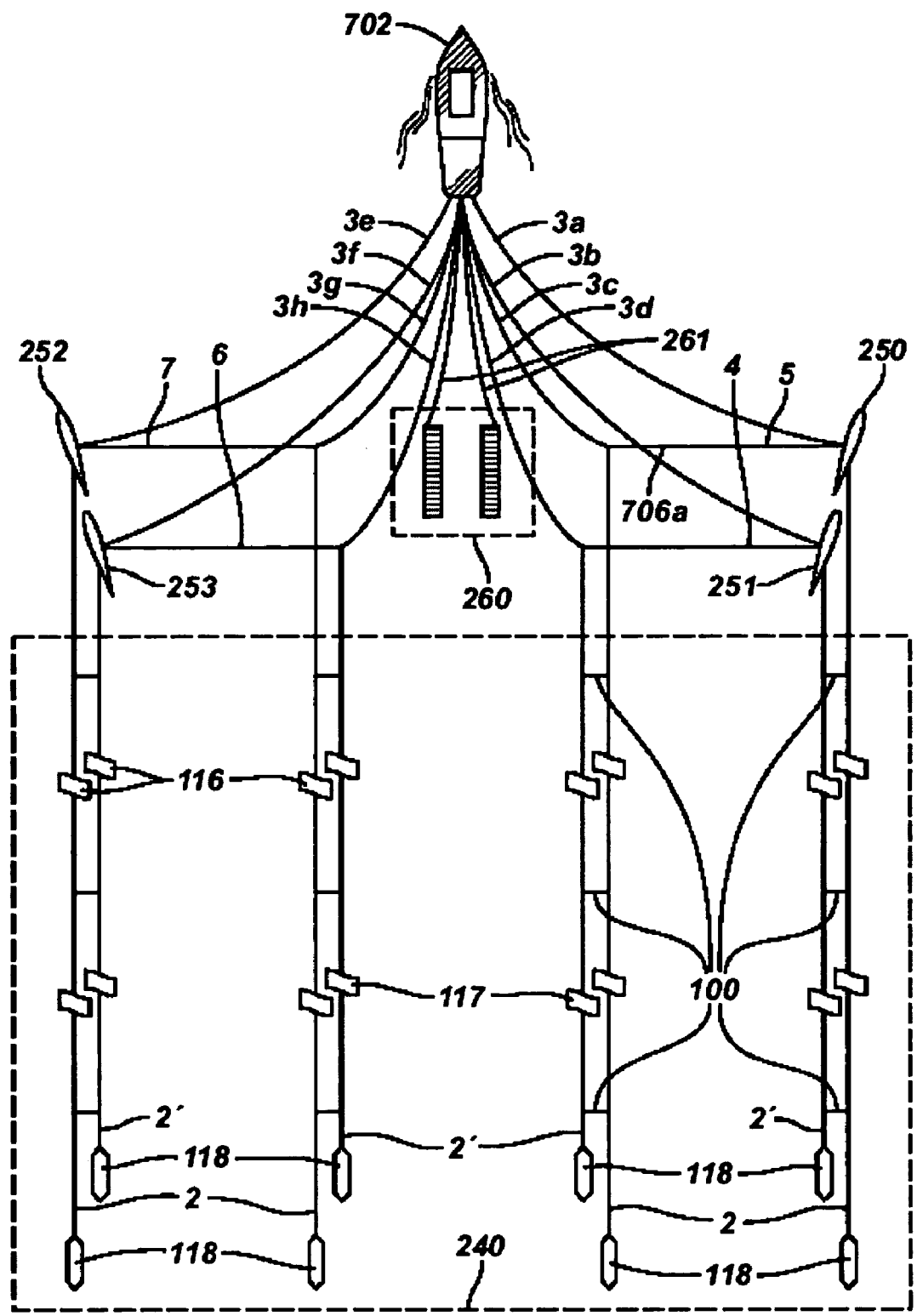
FIG. 7 illustrates one towing arrangement employing apparatus or systems and methods of the invention.

Over/under towing may improve the seismic image considerably as one may be able to separate the downward propagating acoustic wave field from the upward propagating wave field. Among geophysicists this is called de-ghosting. By different means of configuring the towing system it is possible to place pairs of streamers at lateral spacings between the pairs to form an array so as to cover a rectangle. FIG. 7 illustrates one arrangement employing apparatus or systems and methods of the invention. Many variations are possible. A seismic vessel 702 is shown towing an array 240 of seismic hydrophones (not shown) hidden within the streamers 2, 2'. The number of streamer pairs may exceed ten, but four to eight will probably be common. An example of a four-streamer pair configuration is shown in FIG. 7. In the embodiment illustrated, each streamer pair 2, 2' comprises one streamer 2' placed as accurate as possible on top of the other streamer 2. A seismic source 260 towed by tow members 261 (only two source tow members are shown for clarity) provides a pressure pulse that is reflected in the sub surface layers of the sea bottom and recorded by the seismic hydrophones. This signal is used to map the geological structure beneath the sea floor. One set of streamers 2 is towed deep and one set of streamers 2' are towed shallower. Streamers 2 and 2' are deflected laterally with seismic deflectors 250, 251, 252, and 253, which may be passive or remotely controllable. Eight streamers 2 and 2' are illustrated towed by respective eight tow members 3a-3h as indicated, with separation members 4, 5, 6, and 7 provided between adjacent deep streamers 2 and adjacent shallow streamers 2'. Passive or active tow members (not shown) may connect source 260 with one or more streamer tow members. The vertical distance between streamers 2, 2' in a streamer pair may range from 1 meter to 50 meters, and may be about 5 meters. A selected number of hydrophones, either mounted within the streamer or in/on equipment mounted onto the streamer, may be used as receivers in an acoustic ranging system and thereby provide knowledge of the horizontal and vertical position of streamers 2 and 2'. Horizontal streamer separations may range from about 25 to about 180 meters. Depth control of streamers 2 and 2' in this embodiment may be optionally provided by so-called birds 116 which may be of any type, such as small hydrofoils that can provide forces in the vertical plane. One suitable depth control device is the previously described device known under the trade designation "Q-FIN"; another suitable device is that known under the trade designation "DigiBIRD", available from Input/Output, Inc., Stafford, Tex. Illustrated in FIG. 7 is a plurality of connection apparatus 100, which may be configured as more fully illustrated in FIG. 1, embodiment 200 of FIG. 6, embodiment 300 of FIG. 8, or some other configuration. There are many possibilities for the type, number and position of connection apparatus 100, and this will also depend on whether birds 116 are employed. Apparatus 100 may be equally spaced along the length of the streamers, with optional birds 116 in close proximity to connection apparatus 100. Birds 116 may be moved in close proximity to connection apparatus 100 and clamped to streamers 2, 2', hung from streamers 2, 2', or inserted inline in streamers 2, 2' to provide optional supplementary position control, while birds 117, or other streamer positioning device, such as the devices described in U.S. Pat. Nos. 3,774,570; 3,560,912; 5,443,027; 3,605,674; 4,404,664; 6,525,992 and EP patent publication no. EP 0613025, may be placed at intervals between connection apparatus 100 for supplemental position control, for example to reduce streamer "sagging."

FIG. 8 illustrates a perspective view of another embodiment 300 of the invention. Streamers 2 and 2' are illustrated connected together by an elongate rigid or semi-rigid member 110' having first and second ends 112' and 114', end 112' being connected with a first streamer coupler 140, and second end 114' connected via a second streamer coupler 145. An orientation member 116, such as a bird having a body 12 and two independently moveable control surfaces 24, sometimes referred to herein as wings, is illustrated mounted to or attached inline in streamer 2 and aft of elongate member 110 (referenced to flow direction, indicated by arrow "F" in FIG. 8). A second orientation member 116' is mounted to or attached inline in streamer 2'. While orientation members 116 and 116' are depicted as substantially identical, they may be different, as long as they are able to function together to control orientation of the pair of streamers. Alternatively, or in addition thereto, orientation members 116 and 116' may be mounted on streamer couplers 140 and 145, as discussed in more detailed herein. Orientation members 116 and 116' may number more than two. An even or odd number may be employed.

FIG. 9 illustrates a cross-sectional view along the section C-C of FIG. 8, illustrating one possible construction of elongate member 110', here illustrated as a hollow, cylindrical conduit or pipe. Elongate member 110' may comprise more than one part or component, and may include communications components, sensors, and power components, all of which are not shown. In as much as the functions of elongate member 110' are primarily to connect streamers 2 and 2', and serve in controlling distance between streamers 2 and 2', member 110' may be any shape, cross-section, or material of construction as desired. For example, the cross-section of elongate member 110 could be oval or rectangular; its material of construction may be metal, plastic, composite, and the like. One or more parallel, closely spaced elongate members are possible. More than one elongate member may be employed, for example attached together end-to-end. Elongate member 110' could comprise any number of alternative arrangements, including pipe-in-pipe, solid rod-in-pipe, solid rod-in-box arrangements, and the like, allowing sensors, transmitters, receivers, and the like to be carried by elongate member 110'.

Although orientation members 116 and 116' are illustrated in FIG. 8 positioned aft of elongate member 110', it will be understood by those of ordinary skill in the art that the orientation member or members may be positioned forward of elongate member 110. Moreover, the use of both fore and aft orientation members are deemed variants within the present invention.

Very often, as mentioned earlier in reference to FIGS. 1-3, water currents often vary significantly with depth and the two streamers in a pair are easily brought out of the ideal position, which may be directly on top of each other in an "over and under" configuration, or the streamers may "snake" or "feather." To correct for these movements, the apparatus and system of FIG. 8 may enforce a moment on the streamer pair. A moment may be accomplished by moving wings 24 of orientation members 116 and 116' in opposing directions, and translation force may be imposed by positioning wings 24 in identical directions.

The orientation members, or "birds", illustrated in FIG. 8 generally at 116 and 116', may comprise an elongate streamlined body 12, 12' adapted to be mechanically and electrically connected in series in a multi-section marine seismic streamer 2 or 2' of the kind which is towed by a seismic survey vessel and which is used, in conjunction with a seismic source also towed by the vessel, to conduct seismic surveys, as briefly described hereinbefore. To permit such connection, each end of body 12 and body 12' is provided with a respective mechanical and electrical connector, these connectors being complementary to, and designed to interconnect with, streamer end connectors that are normally used to join together adjacent sections of a streamer. Birds 116 and 116' may be provided with two opposed control surfaces, or wings, 24, 24', which may be molded from a fiber-reinforced plastics material, which project outwardly from body 12, 12' and which are independently rotatable about a common axis extending substantially perpendicularly through the longitudinal axis of the body. Rotation of wings 24, 24' may be effected under the control of a control system sealingly housed within body 12, 12'. Wings 24, 24' may be generally rounded and swept back with respect to the direction of tow of streamers 2 and 2' (which direction is opposite of that indicated by the arrow F), in order to reduce the possibility of debris becoming hooked on them. To facilitate their rapid removal and reattachment, wings 24, 24' may be secured to body 12, 12' by a quick-release attachment.

As mentioned hereinbefore, streamers 2 and 2' include hydrophones distributed along their length; they also may include control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. If birds or other like devices are employed, all these lines may be coupled together from one streamer section to another streamer section via respective corresponding lines which may extend through body 12 of bird 116 between coupler 140 and its nearest neighboring coupler 140, and so on down the length of the streamer. Alternatively or additionally, wireless and optical transmission signals may be generated and received by functional components in or on streamers 2 and 2' and bird body 12.

FIGS. 10 to 12 illustrate the operation of bird 116 in the case where streamer 2 or 2' is slightly heavy (slightly negative buoyancy), and bird 116 thus needs to produce lift to maintain the streamer at the desired depth. As streamers 2 and 2' are connected by elongate member 110 (FIG. 8), another bird or other streamer positioning device may be required on or inline with streamer 2' to help move streamer 2', since bird 116 will not only have to overcome cross flow drag and gravity forces on streamer 2, but cross flow drag produced by streamer 2' and elongate member 110. This lift is produced by the flow of the water over the wings 24 of the bird 116, resulting from the desired towing speed of streamers 2, 2' through the water, and can be changed by changing the angle of attack of the wings with respect to the flow. The magnitude of the lift required for moving streamer 2 when by itself (disconnected from a streamer pair) is indicated by the length of the arrows 60. These arrows may be incrementally higher or lower when streamers 2 and 2' are connected with an elongate member 110. If streamer 2 now needs to be moved laterally to the right (as viewed in FIGS. 10 to 12), the angular position of left wing 24 of bird 116 may be first adjusted to increase its lift, while the angular position of right wing 24 is adjusted to decrease its lift, as represented by the length of the arrows 64 in FIG. 11, thus causing bird 116 to roll clockwise from the position shown in FIG. 10 to the position shown in FIG. 11. This clockwise roll may continue until bird 116 reaches a steady state condition shown in FIG. 12, where it can be seen that the vertical component of the lift produced by wings 24, indicated by arrows 66, is equal to the lift represented by arrows 60 of FIG. 10 required to maintain streamer 2 at the desired depth, while the much larger horizontal component, represented by the arrows 68, moves streamer 2 to the right.

FIG. 13 is a schematic diagram of a control scheme useful with apparatus, systems and methods described in reference to FIGS. 8-12. In FIG. 13, "N" refers to the Nth orientation member, while N1, N2, on so on refer to an N1 orientation member, an N2 orientation member, and so forth. Control system 26N comprises a microprocessor-based control circuit 34N having respective inputs 35N to 39N to receive control signals representative of desired depth, actual depth, desired lateral position, actual lateral position and roll angle of orientation member N (i.e. the angular position of body 12N in a plane perpendicular to the longitudinal axis of streamer 2 or 2'). Control circuit 34N may also receive information through input 33N regarding the status or position of orientation members N1, N2, and the like. The desired depth signal can be either a fixed signal or an adjustable signal, while the actual depth signal is typically produced by a depth sensor 40N mounted in or on orientation member N. The lateral position signals may be derived from a position determining system of the kind described in our U.S. Pat. No. 4,992,990 or our International Patent Application No WO9621163. The roll angle signal may be produced by an inclinometer 42N mounted on or within orientation member N. Control circuit 34N may have control outputs 44N, 46N, connected to control respective electrical stepper motors 48N, 50N, each of which is drivingly connected to a respective one of wings 24N. Stepper motors 48N, 50N have respective outputs at which they produce signals representative of their respective current angular positions (and therefore of the current angular positions of wings 24N), which outputs are connected to respective control inputs 52N, 54N of control circuit 34N.

In operation, control circuit 34N may receive between its inputs 35N and 36N a signal indicative of the difference between the actual and desired depths of orientation member N, and may receive between its inputs 37N and 38N a signal indicative of the difference between the actual and desired lateral positions of orientation member N. These two difference signals, along with any feed-forward information received through input 32N, any information about other orientation members N1, N2, etc., through input 33N, and any supervisory control signals received from a supervisory controller through input 45N may be used by control circuit 34N to calculate the roll angle of orientation member N and the respective angular positions of wings 24N which together will produce the necessary combination of vertical force (upwardly or downwardly) and lateral force (left or right) required to move orientation member N to a desired depth and lateral position. Control circuit 34N then adjusts each of wings 24N independently by means of the stepper motors 48N, 50N, so as to start to achieve the calculated roll angle and wing angular positions. Information may also be sent to other orientation members N1, N2, etc., through output 43N, and information may be sent to the supervisory controller (not shown), if any, through an output 41N. Numerous variations in the control scheme are possible. Supervisory controllers, feed-forward controllers, and the like may be cascaded with control system 26. A feed-forward controller, as indicated by input 32N in FIG. 13, may utilize information about currents, wind, and other environmental conditions, in order to counteract for any deviations relative to the nominal that may be predicted to take place, and do so before the deviation actually takes place or to do so in an early stage of the deviation. An adaptive control scheme may also be used.

Systems of the invention may become unstable due to geometry of the streamer pair, the point of application of, and direction of the applied forces. This may cause orientation members to generate undesirable torque on one or both streamers. To remove this undesirable effect, control system 26N in FIG. 13 may be programmed appropriately. While adjusting the angular positions of wings 24N of orientation member N, control circuit 34N may continuously receive signals representative of the actual angular positions of wings 24N from the stepper motors 48N, 50N, as well as signals representative of the actual roll angles of orientation members N, N1, N2, etc., from an inclinometer 42N and input 33N, to enable control circuit 34N to determine and/or predict when the calculated wing angular positions and bird roll angle have been or should be reached. And as the aforementioned difference signals at the inputs 35N to 38N of the control circuit 34 reduce, control circuit 34N may repeatedly recalculate the progressively changing values of the roll angle of orientation member N and the angular positions of the wings 24N required for orientation member N and streamer to reach the desired depth and lateral position, until orientation member N and the streamer to which it is attached actually reach the desired depth and lateral position. Body 12 of any particular orientation member may or may not rotate with respect to streamer 2 or 2'; if body 12 does not rotate it may then twist streamer 2, and perhaps streamer 2', as it rolls. Streamers 2 and 2' then resist this twisting motion, acting together as a kind of torsion spring that tends to return the orientation members to their normal position. However, this torsional action may or may not be beneficial and is not essential, and the orientation members may if desired be designed to rotate to a certain extent with respect to the axis of the streamer to which they are attached or a part of inline.

Figure 14A:
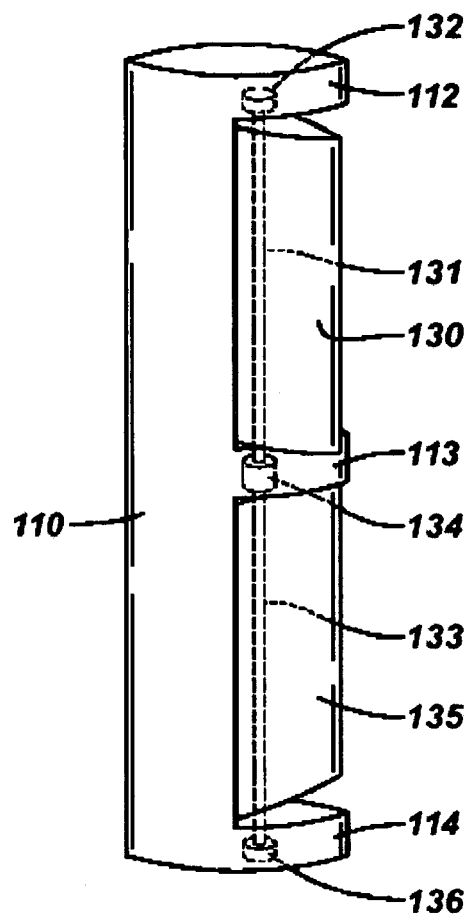
FIGS. 14A and B illustrate perspective views, with portions in phantom, of two embodiments of the invention.
Figure 14B:
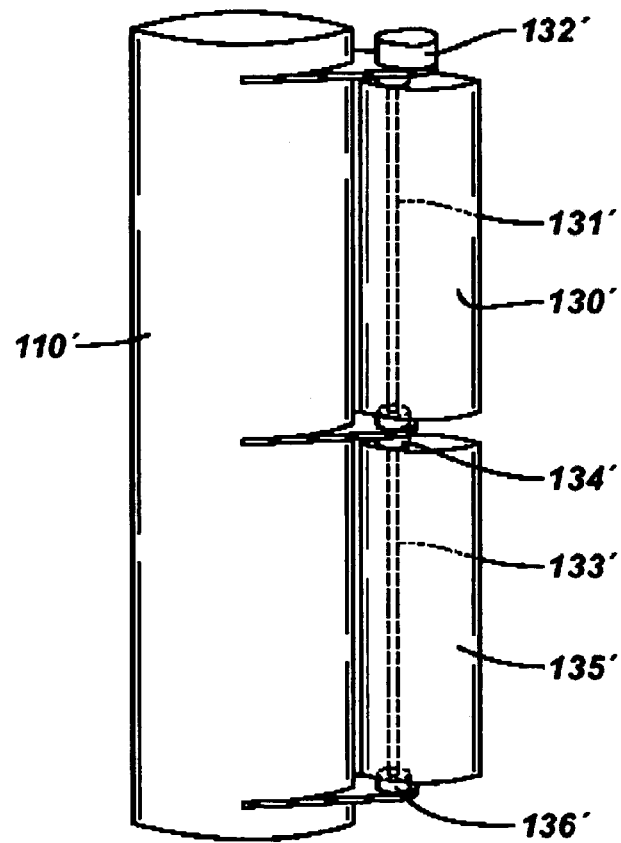

FIGS. 14A and 14B illustrate schematically, with some parts in phantom, two apparatus embodiments of the invention. In FIG. 14A, elongate member 110 comprises an elongate, hydrofoil-shaped body having ends 112 and 114, and a central portion 113. Shown in phantom are two shafts 131 and 133 supported by bearings 132, 134, and 136, also in phantom. Shafts 131 and 133, which may be any cross-sectional shape and may be hollow or solid, may rotate independently of one another in their respective bearings. Bearings 132, 134, and 136 may be mounted inside elongate member 110 in any functional manner, such as welding, bolts, screws, or even molded as part of the structure of the elongate member, such as cast metal depressions made during the manufacture of elongate member 110. In FIG. 14A, shaft 131 supports flap 130, while shaft 133 supports flap 135. As shafts 131 and 133 rotate, their respective flaps 130 and 135 also rotate. Mechanisms responsible for this movement may vary, with three embodiments discussed in reference to FIGS. 15A-C. FIG. 14B illustrates a slightly different arrangement. Flaps 130' and 135' are again mounted on respective shafts 131' and 133'. In the embodiment depicted in FIG. 14B, however, elongate member 110' includes support brackets 132', 134', and 136', which serve the function of bearings for shafts 131' and 133'. Flaps 130' and 135' are also somewhat more extended rearward relative to elongate body 110'.

Figure 15A:
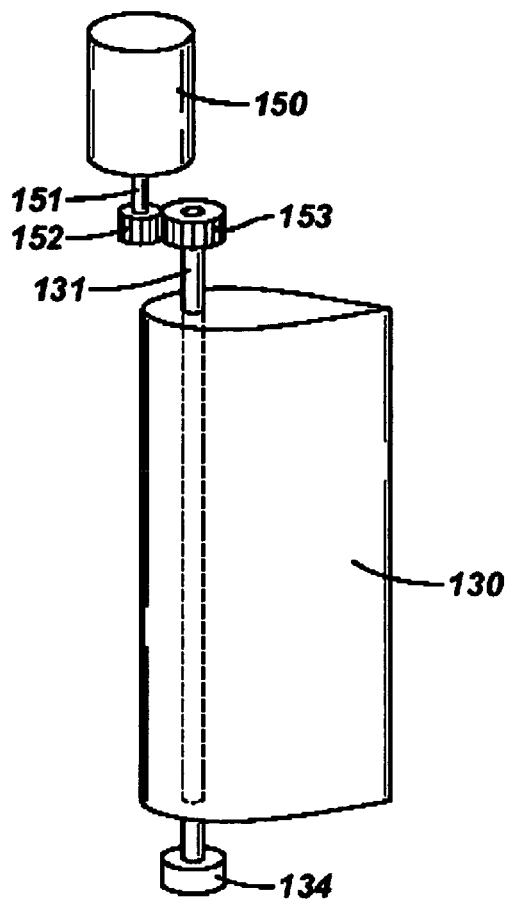
FIGS. 15A-C illustrate schematically drive arrangements for moving flap type orientation members.
Figure 15B:
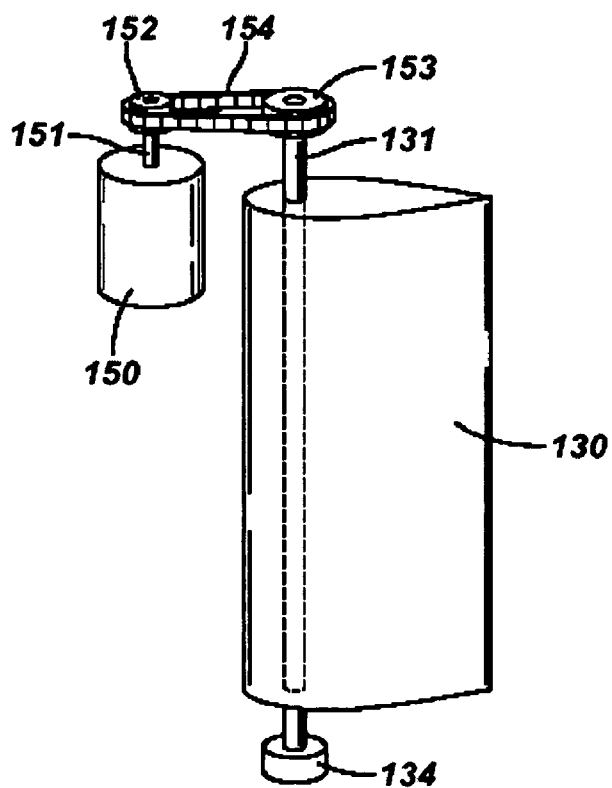
Figure 15C:
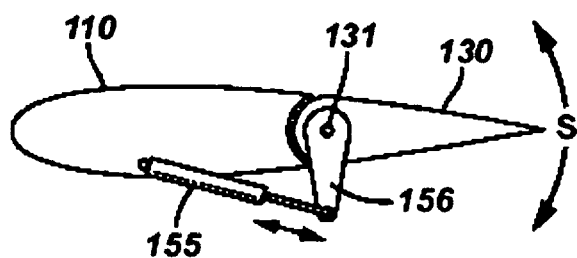

FIGS. 15A-C illustrate schematically three modes of how to make orientation members move in accordance with the present invention. FIG. 15A shows a motor 150 connected to a drive shaft 151 and gear 152. Gear 152 meshes with another gear 153 connected to shaft 131, which in turn is connected through suitable fasteners, not illustrated, to flap 130, and which may rotate within bearing 134. Shaft 131 may be welded or brazed to flap 130, for example. FIG. 15B illustrates another embodiment, wherein motor 150, shaft 151, and gear 152 are provided as in FIG. 15A, however, in this embodiment an endless chain 154 extends around gear 152 and a second gear 153. FIG. 15C illustrates a cross-sectional view of the embodiment of FIG. 15A, similar to the view of FIG. 2, and shows how a linear actuator 155 might be employed with a bracket 156 attached to shaft 131. Linear actuator 155 could be pneumatic, electric, or hydraulic in nature.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures. Thus, although a clamp-on bird and an inline bird may not be structural equivalents in that a clamp-on bird employs one type of fastener, whereas an inline bird employs a different fastener, in the environment of using birds to position streamers, a clamp-on bird and an inline bird may be equivalent structures.

What is claimed is:

1. An apparatus comprising:
    first and second over and under seismic streamers;
    an elongate cylindrical rod disposed between the first and second over and under seismic streamers, wherein the elongate cylindrical rod comprises a set of teeth disposed inside a hollow portion of the elongate cylindrical rod;
    one or more hydrodynamic flaps coupled to the elongate cylindrical rod;
    a shaft longitudinally disposed inside the elongate cylindrical rod; and
    a gear coupled to the shaft.

2. The apparatus of claim 1, wherein the gear comprises a set of teeth configured to couple to the set of teeth disposed inside the hollow portion of the elongate cylindrical rod.

3. The apparatus of claim 1, wherein the elongate cylindrical rod is made from metal or plastic.

4. The apparatus of claim 1, wherein the elongate cylindrical rod is made from a composite material.

5. The apparatus of claim 1, wherein the elongate cylindrical rod comprises a controller, a power supply, sensors or combinations thereof.

6. The apparatus of claim 1, further comprising a motor coupled to the shaft for turning the shaft.

7. The apparatus of claim 1, wherein the elongate cylindrical rod comprises a controller configured to control the position of the hydrodynamic flaps using the teeth on the gear and the teeth inside the hollow portion of the elongate cylindrical rod.

8. An apparatus comprising:
    first and second over and under seismic streamers;
    an elongate member disposed between the first and second over and under seismic streamers;
    a first hydrodynamic flap coupled to the elongate member and disposed between the first seismic streamer and a midpoint of the elongate member;
    a second hydrodynamic flap coupled to the elongate member and disposed between the midpoint and the second seismic streamer;

a first shaft extending from the first seismic streamer to the midpoint and supporting the first hydrodynamic flap; and a second shaft extending from the midpoint to the second seismic streamer and supporting the second hydrodynamic flap.

9. The apparatus of claim 8 comprising one or more streamer position control device attached to the first and second streamers, and wherein the one or more position control device comprises one or more remotely controllable birds.

10. The apparatus of claim 8, wherein the first shaft is rotatable independently from the second shaft.

11. The apparatus of claim 10, wherein the first shaft is configured to rotate the first hydrodynamic flap and the second shaft is configured to rotate the second hydrodynamic flap.

12. The apparatus of claim 8, wherein the elongate member further comprises:
- a motor;
- a drive shaft coupled to the motor;
- a first gear coupled to the drive shaft; and
- a second gear coupled to the first shaft and is configured to mesh with the first gear.

13. The apparatus of claim 12, wherein the motor is configured to rotate the first hydrodynamic flap using the drive shaft, the first gear, the second gear and the first shaft.

14. The apparatus of claim 8, further comprising:
- a linear actuator coupled to the elongate member; and
- a bracket connecting the linear actuator to first shaft.

15. A system comprising:
- first and second over and under seismic streamers;
- an elongate member disposed between the first and second over and under seismic streamers;
- a first hydrodynamic flap coupled to the elongate member and disposed between the first seismic streamer and a midpoint of the elongate member;
- a second hydrodynamic flap coupled to the elongate member and disposed between the midpoint and the second seismic streamer;
- a first shaft extending from the first seismic streamer to the midpoint and supporting the first hydrodynamic flap;
- a second shaft extending from the midpoint to the second seismic streamer and supporting the second hydrodynamic flap;
- a motor;
- a drive shaft coupled to the motor;
- a first gear coupled to the drive shaft;
- a second gear coupled to the first shaft; and
- a chain extending around the first gear and the second gear.

16. The system of claim 15 wherein the first streamer is positioned at a shallower depth than the second streamer.

* * * * *